United States Patent Office 3,309,365
Patented Mar. 14, 1967

3,309,365
ALKYLATED CYCLIC IMIDES AND PROCESSES FOR THEIR PRODUCTION
Ashot Merijan, Rahway, and Frederick Grosser, Midland Park, N.J., assignors to General Aniline & Film Corporation, New York, N.Y., a corporation of Delaware
No Drawing. Filed Oct. 9, 1964, Ser. No. 402,964
16 Claims. (Cl. 260—247.7)

This invention relates to a process of alkylating 5- and 6-membered cyclic imides and to the products resulting therefrom.

In a broad aspect, the present invention is directed to a process for alkylating 5- and 6-membered cyclic imides with α-olefins in the presence of an organic peroxide as an alkylation initiator to produce a large variety of useful alkylated products which may be employed as such or in organic syntheses to yield still another class of useful products.

Accordingly, one or more of the following objects will be achieved by the practice of this invention.

It is an object of this inventin to provide a process for alkylating 5- and 6-membered cyclic imides having useful applications.

Other objects and advantages will become apparent from the following description.

The foregoing objects are attained by the addition of an α-olefin of at least 2 carbon atoms to a 5- and 6-membered cyclic imide while employing an organic peroxide as the initiator. The addition (alkylation) is readily accomplished by heating a mixture consisting of 0.01 to 10 moles of an α-olefin of at least 2 carbon atoms and one mole of a 5- or 6-membered cyclic imide in the presence of about 0.02 to about 0.3 mole of an organic peroxide per mole of an α-olefin at a temperature of 100–200° C. for a period of time ranging from 2 to 48 hours. The 5-, 6-membered cyclic imide may be used in excess to control the degree of alkylation. If an excess is used, it is removed by precipitation and filtration after completion of the alkylation reaction.

The alkylation reaction may also be conducted in solution of an organic solvent common to the cyclic imide and α-olefin. As solvents we found that various alcohols such as methanol, ethanol, propanol, isopropanol, butanol, sec-butanol, amyl alcohol, hexanol, 2-ethyl-1-hexanol, ethylene glycol, 1,2-butanediol,1,4-butanediol, etc. are very effective. Other solvents such as diacetone alcohol, diethylene glycol, ethylene glycol monomethyl ether acetate, and the like may also be employed. It is to be noted that the nature or character of the organic solvent is immaterial so long as it is a liquid, forms a solution with the cyclic imide and alkylated cyclic imide and is less susceptible to alkylation under the reaction conditions.

The amount of organic solvent employed is not critical. Any amount which will yield a solution of the cyclic imide, α-olefin and alkylated cyclic imide will suffice. For purposes of expediency we find that for every part by weight of cyclic imide from 2 to 10 parts of organic solvent, either by volume or by weight, are sufficient to yield a workable solution.

As a peroxide catalyst (initiator) for the alkylation reaction we can employ any one of the known organic peroxides normally employed as initiators in chemical reactions such as, for example, t-butyl-perbenzoate, dibenzoyl peroxide, benzoyl hydroperoxide, t-butyl hydroperoxide, t-butyl perphthalic acid, p-chlorobenzoyl peroxide, t-butyl peracetate, di-t-butyl peroxide, di-t-amyl peroxide, bis-(triethylmethyl)peroxide, t-butyl-pentamethyl ethyl peroxide, etc.

Where alkylated 5- and 6-membered cyclic imides of a low degree alkylation are desired, and a low molecular weight olefin is used, the alkylation reaction may be conducted in the presence of any one of the aforementioned alcohols.

Where it is desired to prepare a solution of the alkylated 5- and 6-membered cyclic imide in a mineral oil or a lubricating oil of a paraffinic stock, the initial alkylation reaction may be conducted in the presence of a higher boiling aliphatic alcohol such as for example hexanol, etc. When the desired degree of alkylation has been obtained the reaction mixture is subjected to vacuum distillation and the removed higher boiling alcohol is replaced by a saturated aliphatic hydrocarbon having a boiling point higher than the alcohol. After the alcohol has been removed there is obtained a solution of the alkylated cyclic imide in solution of the aliphatic hydrocarbon. Saturated aliphatic hydrocarbons having a boiling point higher than hexanol are legion and commercially available. Hence no difficulty should be encountered in the selection of such hydrocarbon in preparing a solution of the alkylated cyclic imide.

The only deviation from the foregoing procedure is where low-boiling α-olefins of from 2 to 6 carbon atoms and the fluoro- and chloro-fluoro α-olefins are employed as the alkylating agents. In such case the organic peroxide catalyst, preferably di-t-butyl peroxide, and the solution of the cyclic imide are added into a stainless steel rocker bomb. The low-boiling α-olefin or fluoro- or chloro-fluoro α-olefin is then charged to the bomb and the bomb heated and maintained at a temperature of from 110° to 140° C. for a period of time ranging from 5 to 28 hours. The pressure developed in the bomb may range from 100–1000 p.s.i. After cooling to room temperature the contents of the bomb are discharged into any suitable vacuum distillation equipment to remove the solvent and the residual product recovered as a solid or a viscous fluid.

The 5- and 6-membered cyclic imides which are alkylated with an α-olefin in accordance with the present invention are characterized by the following formula:

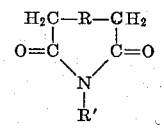

wherein R represents either a single bond joining the two methylene (—CH$_2$—) groups, an oxy or methylene group and R' represents either hydrogen or methyl group.

As examples of such cyclic imides, which are well known in the chemical art, the following are illustrative:

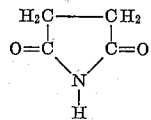

succinimide

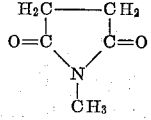

N-methyl succinimide

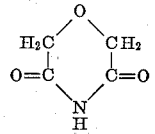

diglycolylimide

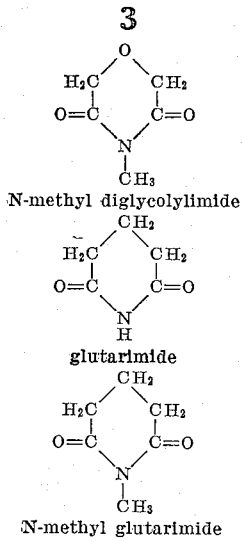

N-methyl diglycolylimide glutarimide

N-methyl glutarimide

Any α-olefin having a molecular weight from about 28 to as high as 2500 may be employed in the alkylation of the 5- and 6-membered cyclic imides. In other words, α-olefins ranging from ethene (ethylene) to as high as polybutenes having molecular weights from 400 to 2500 may be employed. As examples of such α-olefins the following are illustrative:

| | |
|---|---|
| Ethene | 2-ethyl-1-hexene |
| Propene | 1-decene |
| 1-butene | 1-dodecene |
| 1-pentene | 1-tetradecene |
| 2-ethyl-1-butene | 1-hexadecene |
| 2-methyl-1-pentene | 1-heptadecene |
| 1-hexene | 1-octadecene |
| 5-methyl-1-hexene | 1-nonadecene |
| 2-methyl-1-pentene | 1-eicosene |
| 3-ethyl-1-pentene | 1-docosene |
| 1-heptene | 1-tetracosene |
| 1-octene | 1-pentacosene |
| 1-nonene | Polybutenes of molecular weight of 400 to 2500 |

Instead of employing any one of the foregoing individual α-olefins, a mixture of commercial available linear α-olefins produced by cracking petroleum wax or by polymerizing lower olefins may also be used as the alkylating agent. The commercial product composition contains a mixture of linear olefins. Such mixture may contain linear olefins ranging from 6 to 8 carbon atoms, 8 to 12 carbon atoms, 10 to 12 carbon atoms, 12 to 16 carbon atoms, 16 to 20 carbon atoms and as high as 20 to 42 carbon atoms. For example, the product composition of linear heptene having 92% of mono-olefins, contains 89% of α-heptene, 6% of α-hexene and 5% of α-octene based on the mono-olefin basis. By careful distillation of the commercial product composition substantially individual α-olefins are obtained which may be used as the alkylating agent.

While linear α-olefins are preferred because of their commercial availability, we have found that the numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

Instead of employing ethylene (ethene) as the alkylating agent, chloro-fluoro α-olefins such as for example dichlorovinylidene fluoride ($CCl_2$=$CF_2$), chlorovinylidene fluoride ($CHCl$=$CF_2$) chlorotrifluoroethylene ($CClF$=$CF_2$) tetrofluoroethylene ($CF_2$=$CF_2$), vinylidene fluoride $$(CH_2=CF_2)$$

may be used.

By the proper choice of alkylating agent, i.e., α-olefin, and the degree of alkylation, it is possible to obtain alkylated products which are soluble in polar solvents, such as alcohols or which are soluble in aliphatic hydrocarbons of from 6 to 60 carbon atoms including isomers thereof, mineral and lubricating oils having a Saybolt viscosity of from 50 to 200 seconds.

The position at which alkylation occurs in the 5- and 6-membered cyclic imide is primarily in the alpha (to carbonyl) position. In the case of the alkylation of succinimide or N-methyl succinimide with an α-olefin such as, for example, 1-octene, the resulting alkylated product is primarily the 3-octyl succinimide or N-methyl-3-octyl succinimide.

In the alkylation of 5- and 6-membered cyclic imides with α-olefins, more than one mole of the latter can react with each mole of the cyclic imide. For example, with an α-olefin of $C_{15-20}$ using one to three moles in excess of succinimide, diglycolylimide or glutarimide, the adducts would constitute the entire product. (Multiple alkylation is usually the case if the cyclic imides are not used in excess.)

EXAMPLE 1

*3-octyl succinimide*

*Apparatus:* One-liter four-necked flask equipped with stirrer, nitrogen inlet, thermometer and reflux condenser.

The flask was purged with nitrogen and then the following ingredients charged and heated:

Succinimide _____ 396.0 grams (4.0 moles)
1-octene _____ 90.0 grams (0.8 mole)
Methyl isobutyl carbinol __ 400 mls.
Di-t-butyl peroxide _____ 15.0 grams (0.1 mole-initial)

The mixture was heated and maintained at reflux (124°–143° C.) for 20 hours and then an additional 8.0 grams peroxide was added (total peroxide=23.0 grams, 0.16 mole) and reaction continued for 6 more hours. An olefin analysis of the final reaction mixture indicated 0.46% residual 1-octene by weight, corresponding to 3.1 grams only. The contents were then subjected to vacuum stripping and volatiles boiling up to 170° C. and 40 mm. pressure removed. The residue was poured into a one-liter beaker containing 300 mls. of water and heated on a steam bath with occasional stirring. An organic layer formed on top which was extracted twice with ether. The ether layers were combined and evaporated to dryness. The waxy residue thus obtained was placed in 400 mls. of heptane, boiled and filtered. The filtrate was cooled in an ice-water bath and a mass of white crystals obtained. These crystals after drying in a vacuum oven weighed 50 grams, melted at 79–82° C. and had the following elemental analyses.

Percent carbon: Found, 68.13; Calcd., 68.20.
Percent hydrogen: Found, 10.05; Calcd., 10.01.
Percent nitrogen: Found, 6.92; Calcd., 6.62.
Molecular weight: Found, 215; Calcd., 211.

The position of substitution was shown by hydrolysis of the mono-octyl succinimide in 50% aqueous caustic solution which gave no octyl amine as would have been expected if the substitution was on the imide nitrogen. But as the caustic solution was poured into a cold HCl solution, a white crystalline mass resulted which was separated by filtration, washed several times with cold water and finally dried in a vacuum oven. The dried product melted at 86–88° C. After recrystallization from heptane it was analyzed and the following results obtained.

| Element | Found | Calculated for Mono-Octyl Succinic Acid |
|---|---|---|
| Carbon | 62.96 | 62.58 |
| Hydrogen | 10.05 | 9.63 |
| Nitrogen | Nil | 0.0 |

EXAMPLE 2

3-dodecyl glutarimide

*Apparatus:* Same as described in Example 1.

The flask was initially purged with nitrogen and then charged as follows:

Glutarimide _____ 339.0 (3.0 moles).
Hexanol _____ 200 mls.
1-dodecene _____ 84.0 grams (0.5 mole).
Di-t-butyl peroxide _____ 15.0 grams (0.1 mole).

The contents were heated and maintained at 130–140° C. for 24 hours. Then, just prior to cooling, a sample was withdrawn and analyzed for 1-dodecene. It contained 0.85% by weight residual 1-dodecene, corresponding to 5.1 grams only. The contents were then discharged into a one-liter beaker containing 500 mls. of water and stirred on a steam bath for two hours. The hexanol layer was then separated and placed in a 500-ml. reaction flask. The solvent and all other volatiles were stripped in vacuum (150° C./3.0 mm. Hg) and the residue cooled and transferred into a one-liter beaker. Petroleum ether (40 mls.) was added into the beaker, boiled for several minutes and filtered. The filtrate was then cooled in an ice-water bath for two hours. The resulting white crystalline mass was separated by suction filtration, washed with cold petroleum ether and dried in a vacuum oven. The product thus obtained weighed 57.0 grams and melted at 62–65° C. After recrystallizing twice more from petroleum ether it was analyzed as follows:

Molecular weight: Found, 286; calcd., 281.
Percent nitrogen: Found, 5.30; calcd., 4.97.

EXAMPLE 3

3-(4-methylpentyl)succinimide

*Apparatus:* One-liter stainless steel rocker bomb.

The following ingredients were directly charged into the bomb:

Succinimide _____ 396.0 grams (4.0 moles).
4-methylpentene-1 _____ 84.0 grams (1.0 mole).
Ethyl alcohol _____ 200 mls.
t-Butyl hydroperoxide
 (90%) _____ 30.0 grams (0.3 mole).

The bomb was flushed with nitrogen, sealed and heated with shaking. After maintaining at 120–140° C. for 18 hours, it was cooled and the contents discharged into a one-liter distillation flask and all the volatiles removed in vacuum (110° C./25 mm. Hg). The residue after cooling (mostly solid) was discharged into a one-liter beaker and about 300 mls. of heptane added and then the beaker placed on a steam bath. The contents were maintained at 70–90° C. for half an hour and then suction filtered while hot. The filter cake was once more slurried in hot heptane (200 mls.) and filtered. The filtrates were combined, and after reducing the volume by about one-third, it was cooled in ice-water bath. After an hour a mass of white crystals had settled which were separated by suction filtration, washed with cold heptane several times and dried finally in a vacuum oven at 40–50° C. The dried product weighed 75 grams and melted at 85–88° C. After recrystallizing once more from heptane, it was submitted for nitrogen analysis with the following results:

Percent nitrogen: Found, 7.30; calcd. 7.64.

EXAMPLE 4

*Apparatus:* Same as described in Example 1.

The flask was purged with nitrogen and then the following ingredients charged with continued mild nitrogen pressure on the system:

Succinimide _____ 49.5 grams (0.5 mole).
n-Amyl alcohol _____ 150.0 grams.

The mixture was stirred and heated till a clear solution was obtained. And then while hot (80–100° C.), the following solution was added within five minutes:

Chevron C15–20 α-olefins _____ 244.0 grams
 (A mixture of cracked wax α-    (1.0 mole).
 olefins with about 92% terminal
 unsaturation and an average
 MW of 244. This produce is
 marketed by California Chemi-
 cal Company.)
Di-t-butyl peroxide _____ 15.0 grams
                                 (0.1 mole-initial).

The resulting solution was further heated and maintained at reflux (135–140° C.). After six hours another 15.0 grams of the peroxide was added (total peroxide=30 grams, 0.2 mole) and the refluxing continued for 12 more hours. A sample was withdrawn prior to cooling and analyzed. Residual olefin analysis showed 5.9% unsaturation as Chevron C15–20 α-olefins by the weight of the solution, corresponding to 28 grams only. The contents were then subjected to vacuum distillation and all the volatiles boiling up to 140° C. pot temperature at 3.0 mm. Hg were stripped. The residue which was a light brown fluid at room temperature weighed 290 grams and was soluble in all hydrocarbons and mineral oils. It was analyzed for nitrogen and found to constitute 2.2% vs. 2.38% for expected.

EXAMPLE 5

N-methyl-3-octyl succinimide

Example 1 was repeated with the exception that 4 moles of succinimide were replaced by 4 moles (452 grams) of N-methyl succinimide. The resulting waxy residue was placed in 450 mls. of heptane, boiled and filtered. The filtrate was cooled in an ice-water bath and a mass of white crystals obtained. The crystals, after drying in a vacuum oven, were submitted for nitrogen analysis and molecular weight determination with the following results:

Percent nitrogen for N-methyl-3-octyl succinimide: Calcd., 6.21; found, 6.45. Molecular weight: Calcd., 225.31; found, 233.0.

EXAMPLE 6

3-dodecyl diglycolylimide

Example 2 was repeated with the exception that 3 moles of glutarimide were replaced by 3 moles (345 grams) of diglycolylimide. After recrystallizing twice more from petroleum ether, the product was submitted for nitrogen analysis and molecular weight determination with the following results:

Percent nitrogen for 3-dodecyl diglycolylimide: Calcd., 4.94; found, 5.10. Molecular weight: Calcd. 283.39; found, 277.

The alkylated cyclic imides prepared as above in which the nitrogen atom is unsubstituted undergo vinylation by first forming the potassium salt by mixing the alkylated compound with about 2% by weight of powdered caustic potash distilling off the water followed by vinylation at about 15 atmospheres of pressure with a mixture of acetylene and nitrogen in the conventional manner. The resulting monomers polymerize by the conventional solution polymerization to yield homopolymers having solubility in a wide range of polar and non-polar solvents. The solubility can be systematically controlled during the alkylation reaction, both by the type of α-olefin used and the amount thereof, so that after vinylation homopolymers are obtained which are still soluble in polar solvents (alcohols, etc.) as well as all intermediate degrees of solubility between polar and non-polar solvents. Thus, homopolymers with a low degree of alkylation are still soluble in ethanol so that they can be formulated with "Freon" propellants to yield hair sprays whose sensitivity to moisture is considerably reduced. Homopolymers with a high degree of alkylation are soluble in aliphatic hydrocarbons, mineral and lube oils. In the latter case, they are useful as sludge dispersants and viscosity index improvers for lubricating oils. This is in sharp contrast to homopolymers prepared from non-alkylated N-vinyl imides which are insoluble in aliphatic hydrocarbons, mineral oils and lube oils.

The alkylated products are especially useful for incorporation into polyalkylene plastics such as polyethylene, polypropylene and polybutene to improve the dye receptivity thereof either in sheet form, fiber or fabric.

The 5- and 6-membered cyclic imides when alkylated with α-olefins of from 8 to 42 carbon atoms yield alkylates which are useful as ashless dispersants for engine oils and as rust inhibitors in a variety of lubricating oils, including engine oils.

In lieu of a halo- α-olefin, allyl alcohol or allyl cyanide may be used. With the former, the hydroxy function is introduced making possible further reactions to many useful derivatives. With the latter, the nitrile group can be converted to amide or carboxyl, making possible many other useful derivatives.

The alkylated cyclic imides prepared as above in which the nitrogen atom is unsubstituted are excellent starting materials for the preparation of m-nitro benzyl derivatives. In this preparation 1 mole of alkylated cyclic imide, formaldehyde or paraformaldehyde, and a subsituted or unsubstituted nitrobenzene in which one of the meta positions to the nitro group is unoccupied (e.g., p-nitrotoluene, p-chloronitrobenzene; 1,3-dimethyl-4-nitrobenzene, etc.) are condensed in the presence of sulfuric acid in accordance with the procedure outlined in U.S. 2,652,403. After reduction to the corresponding m-amino benzyl derivatives, there are obtained products which are valuable dye intermediates.

While the present invention has been directed to the alkylation of N-methyl substituted and unsubstituted 5- and 6-membered cyclic imides, 5- and 6-membered cyclic imides in which the nitrogen atom is substituted by an alkyl of from 2 to as high as 18 carbon atoms, hydroxy alkyl or alkylaminoalkyl wherein the alkyl contains from 1 to 6 carbon atoms may be alkylated in accordance with the foregoing procedure to yield a new series of useful compounds.

We claim:

1. A process of preparing alkylated cyclic imides which comprises heating from 0.01 to 10 moles of an α-olefin selected from the class consisting of chloro-fluoro-α-olefin and fluoro-α-olefin of 2 carbon atoms and an α-olefin of from 2 to 100 carbon atoms, with 1 mole of a cyclic imide having the following formula:

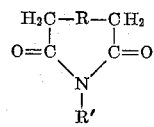

wherein R represents a member selected from the class consisting of a single bond joining the two methylene groups, an oxy and methylene group and R' represents a member selected from the class consisting of hydrogen and methyl, at a temperature of from 100°–200° C. in the presence of about 0.02 to about 0.3 moles of an organic peroxide per mole of said α-olefin.

2. A process of preparing alkylated N-methyl succinimide which comprises heating 1 mole of N-methyl succinimide with from 0.01 to 10 moles of an α-olefin selected from the class consisting of chloro-fluoro-α-olefin and fluoro-α-olefin of 2 carbon atoms and an α-olefin of from 2 to 100 carbon atoms, at temperature of from 100°–200° C. in the presence of about 0.02 to about 0.3 moles of an organic peroxide per mole of said α-olefin.

3. A process of preparing alkylated succinimide which comprises heating 1 mole of succinimide with from 0.01 to 10 moles of an α-olefin selected from the class consisting of chloro-fluoro-α-olefin and fluoro-α-olefin of 2 carbon atoms and an α-olefin of from 2 to 100 carbon atoms, at a temperature of from 100°–200° C. in the presence of about 0.02 to about 0.3 moles of an organic peroxide per mole of said α-olefin.

4. A process of preparing alkylated diglycolylimide which comprises heating 1 mole of diglycolylimide with from 0.01 to 10 moles of an α-olefin selected from the class consisting of chloro-fluoro-α-olefin and fluoro-α-olefin of 2 carbon atoms and an α-olefin of from 2 to 100 carbon atoms, at a temperature of from 100°–200° C. in the presence of about 0.02 to about 0.3 moles of an organic peroxide per mole of said α-olefin.

5. A process of preparing alkylated glutarimide which comprises heating 1 mole of glutarimide with from 0.01 to 10 moles of an α-olefin selected from the class consisting of chloro-fluoro-α-olefin and fluoro-α-olefin of 2 carbon atoms and an α-olefin of from 2 to 100 carbon atoms, at a temperature of from 100°–200° C. in the presence of about 0.02 to about 0.3 moles of an organic peroxide per mole of said α-olefin.

6. A process of preparing 3-octyl succinimide which comprises heating 1 mole of succinimide with 0.2 moles of α-octene at a temperature of 124°–143° C. in the presence of about 0.04 mole of di-t-butyl peroxide.

7. A process of preparing 3-dodecyl glutarimide which comprises heating 1 mole of glutarimide with 0.17 moles of α-dodecene at a temperature of 130°–140° C. in the presence of about 0.035 moles of di-t-butyl peroxide.

8. A process of preparing 3-(4-methylpentyl) succinimide which comprises heating 1 mole of succinimide with 0.25 moles of 4-methylpentene-1 at a temperature of 120°–140° C. in the presence of about 0.075 moles of t-butyl hydroperoxide.

9. A process of preparing N-methyl-3-octyl succinimide which comprises heating 1 mole of succinimide with 0.2 moles of α-octene at a temperature of 124°–143° C. in the presence of about 0.04 moles of di-t-butyl peroxide.

10. A process of preparing 3-dodecyl diglycolylimide which comprises heating 1 mole of diglycolylimide with 0.17 moles of α-dodecene at a temperature of 130°–140° C. in the presence of 0.035 moles of di-t-butyl peroxide.

11. An alkyl-substituted cyclic imide of the formula:

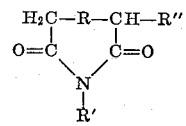

wherein R represents a member selected from the class consisting of a single bond, an oxy and methylene group, R' represents a member selected from the class consisting of hydrogen and methyl, and R'' represents an alkyl group of from 8 to 42 carbon atoms.

12. 3-octyl succinimide having the following formula:

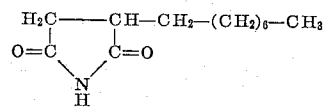

13. 3-dodecyl glutarimide having the following formula:

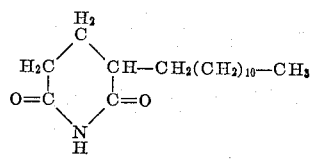

14. 3-(4-methylpentyl)-succinimide having the following formula:
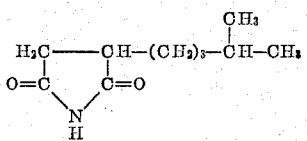
15. N-methyl-3-octyl succinimide having the following formula:
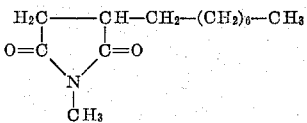
16. 3-dodecyl diglycolylimide having the following formula:
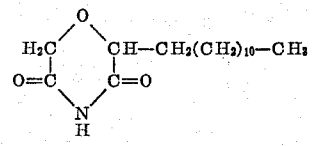
No references cited.
ALEX MAZEL, *Primary Examiner.*
JOSE TOVAR, *Assistant Examiner.*